United States Patent [19]
Kralowetz

[11] 3,837,210
[45] Sept. 24, 1974

[54] PROCESS AND MACHINE FOR SWAGING RECTANGULAR-SECTION WORKPIECES

[76] Inventor: Bruno Kralowetz, St. Ulrich 142, Steyr, Austria

[22] Filed: Apr. 13, 1973

[21] Appl. No.: 350,737

[30] Foreign Application Priority Data
May 3, 1972  Austria .............................. 3823/72

[52] U.S. Cl.......................... 72/403, 72/404, 72/452
[51] Int. Cl............................................... B21j 7/18
[58] Field of Search ............. 72/402, 403, 404, 405, 72/452

[56] References Cited
UNITED STATES PATENTS
3,014,273  12/1961  Appel ................................... 72/403
3,045,515  7/1962  Kralowetz............................. 72/402
3,596,497  8/1971  Kralowetz............................. 72/404

*Primary Examiner*—C. W. Lanham
*Assistant Examiner*—Gene P. Crosby
*Attorney, Agent, or Firm*—Kurt Kelman

[57] ABSTRACT

The workpiece is swaged by first and second pairs of dies, which are angularly spaced 90° apart and caused to blow in alternation on the workpiece. The dies of the first pair are caused to blow on the workpiece. The dies of the second pair are subsequently caused to blow on the workpiece. The dies of the first pair are caused to remain in contact with the workpiece until the dies of the second pair are in contact with the workpiece.

6 Claims, 4 Drawing Figures

PATENTED SEP 24 1974

3,837,210

PROCESS AND MACHINE FOR SWAGING RECTANGULAR-SECTION WORKPIECES

This invention relates to a process and apparatus for swaging rectangular-section workpieces with a swaging machine which comprises two pairs of associated dies, one pair of associated dies being angularly spaced 90° from the other pair and the two die pairs blowing alternately on the workpiece.

When workpieces which are square or rectangular in cross-section are swaged between only two dies blowing at the same time, a tapered cross-section is often formed because the workpieces do not keep their rectangular or square cross-sectional shape as they are shaped but the profile is shifted towards the configuration of a diamond or parallelogram. This is due to the fact that the original cross-section of the workpiece is not always exactly symmetrical with respect to the center line which is parallel to the direction of the blow or that portions differing in hardness are provided on both sides of the center line, or to similar causes. Where such irregularities are present, the oppositely acting blowing forces act no longer on the same line but their lines of action are offset so that a turning moment is produced, which results in a shifting of the profile.

This formation of a taper can be prevented by the provision of four rather than two dies which blow at the same time on all four sides of the workpiece. In such an arrangement, however, the cross sectional reduction of the workpiece and the speed of travel are rather limited because the simultaneous blowing of the dies obstructs the flow of the material.

It is an object of the invention to eliminate these disadvantages and to provide a process for swaging rectangular-section workpieces in such a manner that the risk of a formation of a taper is eliminated and the flow of material is not limited while swaged workpieces are produced which are exactly rectangular or square in cross-section. Another object of the invention is to provide a swaging machine which can be used to swage according to the process of the invention and which does not involve a special structural expenditure and does not require special attachments or the like compared to known continuous forging machines.

The process according to the invention resides essentially in that the workpiece is held in contact with a pair of dies blowing first on two opposite surfaces of the rectangular workpiece at least until a second pair of dies contact the two other opposite surfaces of the workpiece. The workpiece is centered by the swaging dies themselves because the first pair of dies retain the workpiece until the second deformation begins. The working phases of the pairs of dies slightly overlap in time and the first pair of dies effectively hold the workpiece in position to be forged by the second pair of dies. For this reason, the formation of a taper is precluded, and because the workpiece is simultaneously contacted by all four dies only for a very small time during each swaging cycle, the flow of the material will not be obstructed so that there is no limitation as to the cross-sectional reduction of the workpiece and the speed of travel.

The invention also provides a swaging machine which serves to carry out the process and comprises two pairs of associated dies which are driven by eccentrics. The eccentrics are associated with the two pairs of dies and are relatively displaced out of phase by an angle which is smaller than 180° but larger than 0°. This phase displacement of the eccentrics is smaller than in normal continuous swaging machines, in which the displacement is 180° and has the result that the pairs of associated dies contact the workpiece in a faster succession and the two pairs do not reach their outer and inner dead centers, respectively, at the same time. The magnitude of the phase displacement will depend on the depth of penetration of the dies into the workpiece. In case of a larger depth of penetration, the working phase is longer so that the second pair of dies may lag behind the first by a larger phase angle and can yet contact the surface of the workpiece before the first pair of dies disengage the same. Such an adjustment of the eccentrics does not involve a special difficulty and can be performed virtually in every machine so that the process according to the invention can readily be carried out with a conventional continuous swaging machine, e.g., if the mesh of the gears on the shafts of the eccentrics is changed.

It will be particularly desirable to arrange the eccentrics with a phase displacement of 20°–80° when a large reduction is desired and with a phase displacement which is larger than zero and smaller than 30° when a small reduction or sizing is desired. Phase displacements of this magnitude result in optimum conditions and in the best results because the first pair of dies hold the workpiece just as long as is required to ensure a good centering but disengage the workpiece so soon that the flow of material is not obstructed.

To prevent adjacent tools from blowing one on the other when the two pairs of dies blow in rapid succession, the dies which are carried by the connecting rods at the ends thereof comprise known protruding impact bars which extend transversely to the axis of the workpiece and are staggered in the direction of the axis of the workpiece from impact bars of the directly adjacent dies. In such an arrangement, the connecting rods can even blow at the same time without causing a mutual obstruction of the dies because the impact bars would then mesh like teeth, and the two pairs of dies may be displaced in phase even by very slight angles to that even finer sizing operations can be performed out of which the dies penetrate only to a very small depth.

The process according to the invention will now be explained more fully with reference to the accompanying drawings, in which an embodiment of a suitable swaging machine is diagrammatically shown by way of example. In the drawing FIG. 1 shows the basic arrangement of the dies of a swaging machine which comprises two swaging boxes containing four dies each.

Figure 1:
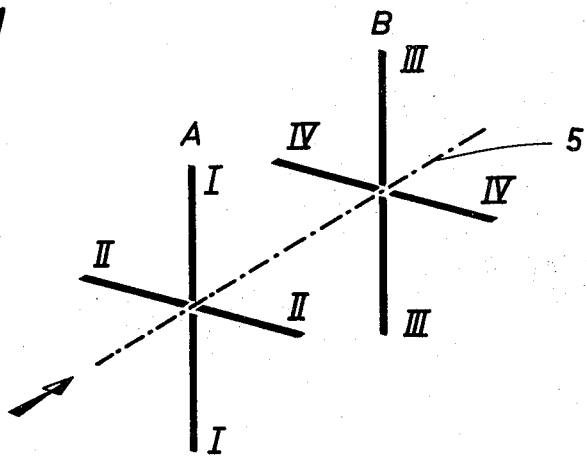
Figure 2:
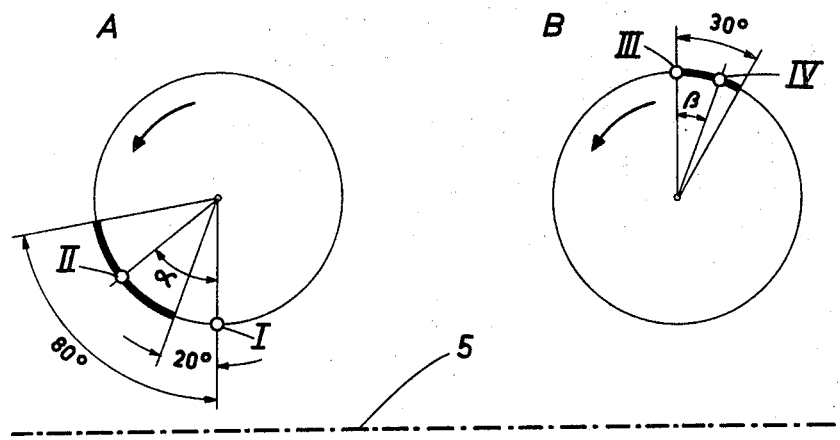
FIG. 2 illustrates the sequence of blows and the blow phase angles of these dies.

A large reduction of the workpiece is to be effected in a swaging box A, which is the first in the direction of travel. For this reason, the two pairs I, II of dies 4 are displaced out of phase by blow phase angle α, which is in the range of 20–80° (see FIG. 2). The second swaging box B serves to size the workpiece. For this reason, the pairs III, IV of dies 4 are displaced out of phase by blow phase angle β, which must not exceed 30° (see also FIG. 2). The actual magnitudes of the blow phase angles α, β depend on the depth of penetration of the pairs of dies because this depth determines the time in which the aligned pairs of dies I, III of the dies contact the workpiece and this time determines in turn the time when the aligned pairs II, IV of the dies begin to contact the workpiece and the maximum phase displacement. It will be understood that the phase displacement between the pairs of dies I, II and III, IV, respectively, must not be too small because in that case the overlap of their working phases would be too large and the flow of the material could be obstructed. If two or more swaging boxes are arranged in succession, the sequences of blows of die pairs I, II and III, IV will be selected in dependence on each other. For instance, when the pair of dies I are at their inner dead center, which means that the swaging blow has been completed, the aligned pair of dies III will be at their outer dead center to begin the swaging blow. The aligned pairs of dies II and IV are timed in dependence on the aligned pairs of dies blowing first and lag the same by the phase angle α or β, respectively.

Figure 3:
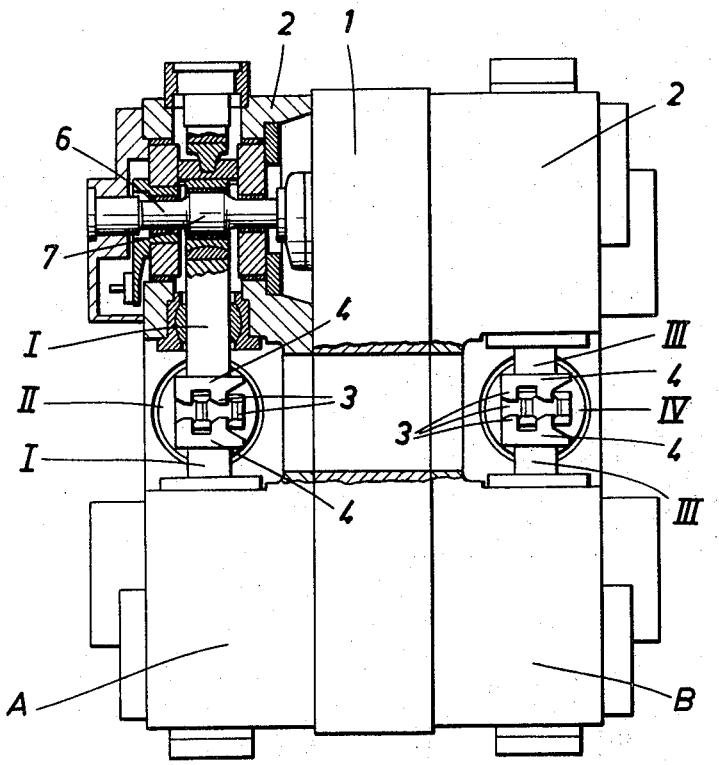
FIG. 3 is a side elevational view, with a partial section taken on line III-III of FIG. 4 and shows a swaging machine.
Figure 4:
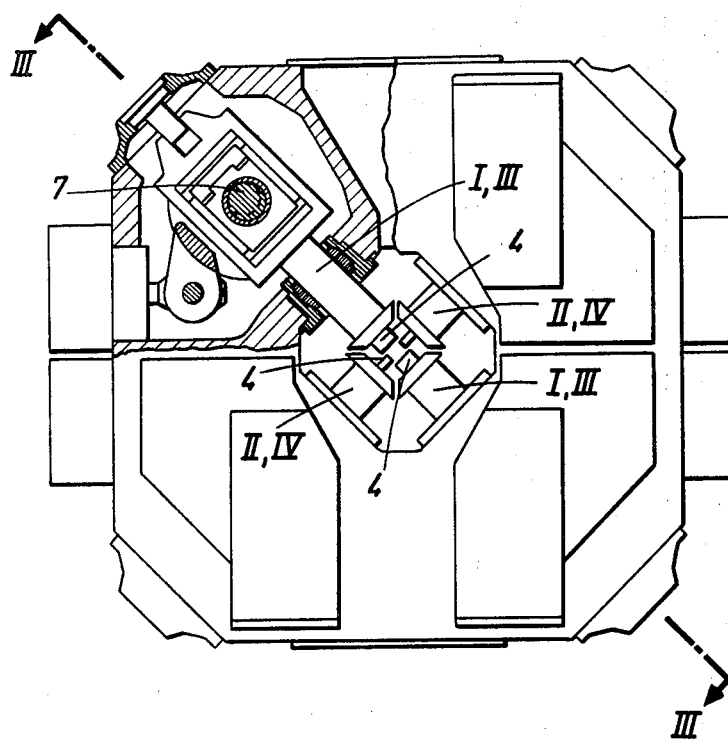
FIG. 4 is an end view, with a partial transverse section, of swaging machine.

FIGS. 3 and 4 show a swaging machine which comprises two swaging boxes 2 arranged in series and an intervening, common gearbox 1. Each swaging box 2 comprises two pairs of die assemblies I, II and III, IV, the pairs in each box being angularly spaced 90° apart and blow in alternation. Each die assembly comprises die 4 and impact bar 3. These impact bars are staggered in the direction of the axis 5 of the workpiece from those of the immediately adjacent dies so that if all four die assemblies blow at the same time or if the pairs of die assemblies I, II or III, IV are only slightly displaced out of phase the impact bars will not strike one on the other but will mesh like teeth. Each die assembly is driven by an eccentric shaft 6, which is parallel to the axis 5 of the workpiece. The eccentrics 7 associated with associated pairs of die assemblies I, II and III, IV are displaced out of phase by a certain angle α, β, which depends on the depth of penetration of the pair of die assemblies I, III which blow first. The phase displacement must be so large that the subsequently blowing pair of die assemblies II, IV begin to contact the surface of the workpiece during the working phase of the first pair of die assemblies, i.e., not later than the time at which the first pair of die assemblies I, III disengage the workpiece. As a result, the workpiece is centered by the first pair of die assemblies and is held in position until the second pair of die assemblies begin their deforming work. The formation of a taper is prevented. Because the first pair of die assemblies are disengaged from the workpiece shortly after the subsequently blowing pair of dies have contacted the workpiece, there is no risk of an obstruction of the flow of material and, for this reason, no limitation to the reduction and to the speed of travel.

What is claimed is:

1. A process of swaging a workpiece of rectangular cross section by means of first and second pairs of associated dies, the first pair of associated dies being angularly spaced 90° from the second pair of associated dies and each pair of dies being caused to blow alternately on the workpiece, which process comprises
   1. causing the associated dies of the first pair to blow on the workpiece,
   2. subsequently causing the associated dies of the second pair to blow on the workpiece, and
   3. causing the dies of the first pair to remain in contact with the workpiece until the dies of the second pair are in contact with the workpiece.

2. A process as set forth in claim 1, in which the dies of the first pair are caused to be disengaged from the workpiece before the dies of said second pair are disengaged from the workpiece.

3. A machine for swaging a workpiece of rectangular cross section, which comprises
   1. first and second pairs of associated dies, the first pair of associated dies being angularly spaced 90° from the second pair of associated dies, and
   2. drive means comprising eccentrics operatively connected to respective ones of the dies for operating the pairs of associated dies
      a. the eccentrics operatively connected to the dies of the first pair being displaced out of phase by an angle which is larger than zero and smaller than 180° from the eccentrics operatively connected to the dies of the second pair, the angular phase displacement causing the associated dies of the first pair first to blow on the workpiece, the associated dies of the second pair subsequently to blow on the workpiece, and the dies of the first pair to remain in contact with the workpiece until the dies of the second pair are in contact with the workpiece.

4. A swaging machine as set forth in claim 3, in which said angle is between 20° and 80°.

5. A swaging machine as set forth in claim 3, in which said angle is smaller than 30°.

6. A swaging machine as set forth in claim 3, in which said workpiece is longitudinally movable along a predetermined path, and comprising connecting rods each of which is operatively connected to a respective one of the eccentrics and has a free end carrying a respective one of the dies, each die comprises a protruding impact bar which extends transversely to said path, and the impact bars of adjacent dies are staggered in relation to each other in the direction of the path.

* * * * *